(12) United States Patent
Kikuchi

(10) Patent No.: US 9,638,892 B2
(45) Date of Patent: May 2, 2017

(54) REAR CONVERSION LENS

(71) Applicant: SONY CORPORATION, Tokyo (JP)

(72) Inventor: Masahito Kikuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/763,610

(22) PCT Filed: Feb. 14, 2014

(86) PCT No.: PCT/JP2014/000764
§ 371 (c)(1),
(2) Date: Jul. 27, 2015

(87) PCT Pub. No.: WO2014/132584
PCT Pub. Date: Sep. 4, 2014

(65) Prior Publication Data
US 2015/0355437 A1    Dec. 10, 2015

(30) Foreign Application Priority Data

Mar. 1, 2013 (JP) .................................. 2013-040614

(51) Int. Cl.
*G03B 17/00* (2006.01)
*G02B 13/00* (2006.01)
(Continued)

(52) U.S. Cl.
CPC ......... *G02B 13/0015* (2013.01); *G02B 15/08* (2013.01); *G02B 15/10* (2013.01); *H04N 5/2254* (2013.01)

(58) Field of Classification Search
USPC ........................................................ 396/530
See application file for complete search history.

(56) References Cited

U.S. PATENT DOCUMENTS 2,578,624 A *   12/1951   Back ..................... G02B 9/12
                                                      359/774
4,588,265 A      5/1986   Takahashi
(Continued)

FOREIGN PATENT DOCUMENTS

JP    58-102207 A    6/1983
JP    11-194268 A    7/1999
(Continued)

OTHER PUBLICATIONS

International Search Report issued May 20, 2014 in PCT/JP2014/000764.

(Continued)

*Primary Examiner* — Rodney Fuller
(74) *Attorney, Agent, or Firm* — Oblon, McClelland, Maier & Neustadt, L.L.P.

(57) ABSTRACT

A rear conversion lens includes: a chassis including two opposite ends, the chassis including light-transmitting holes on the ends, respectively; a first coupler configured to detachably couple one of the ends of the chassis with an image field side of an image-pickup lens of a three-chip camera including three first image sensors, the image-pickup lens being designed based on an assumption that the image-pickup lens is to be used with a color-separation prism in combination; a second coupler configured to detachably couple the other end of the chassis with a single-chip color camera including a second image sensor, the second image sensor including an image field larger than an image field of the first image sensors of the three-chip camera; and an optical system including a first lens group, a second lens group, and a third lens group arranged in the chassis in this order from an object side, the first lens group having a negative compound focal length, the second lens group (Continued)

being configured to correct a spherical aberration, the third lens group being configured to form an image.

7 Claims, 17 Drawing Sheets

(51) Int. Cl.
*G02B 15/08* (2006.01)
*H04N 5/225* (2006.01)
*G02B 15/10* (2006.01)

(56) References Cited

U.S. PATENT DOCUMENTS

| | | | | |
|---|---|---|---|---|
| 4,591,234 A | * | 5/1986 | Hamanishi | G02B 15/08 |
| | | | | 359/675 |
| 4,749,263 A | * | 6/1988 | Taniguchi | G02B 15/08 |
| | | | | 359/675 |
| 4,830,473 A | * | 5/1989 | Kudo | G02B 15/08 |
| | | | | 359/675 |
| 5,172,275 A | * | 12/1992 | DeJager | G02B 13/24 |
| | | | | 359/754 |
| 5,499,069 A | * | 3/1996 | Griffith | G02B 15/08 |
| | | | | 348/E5.024 |
| 5,703,716 A | * | 12/1997 | Furuta | H04N 5/2254 |
| | | | | 359/423 |
| 6,288,847 B1 | | 9/2001 | Tsutsumi | |
| 6,813,089 B2 | | 11/2004 | Tsutsumi | |
| 2003/0151827 A1 | * | 8/2003 | Tsutsumi | G02B 15/08 |
| | | | | 359/675 |
| 2009/0080087 A1 | * | 3/2009 | Yamada | G03B 19/12 |
| | | | | 359/672 |
| 2013/0308034 A1 | * | 11/2013 | Ogata | G02B 15/12 |
| | | | | 348/335 |

FOREIGN PATENT DOCUMENTS

| | | |
|---|---|---|
| JP | 2003-302574 A | 10/2003 |
| JP | 2005-107261 A | 4/2005 |
| JP | 2006-349904 A | 12/2006 |
| JP | 2012-47869 A | 3/2012 |

OTHER PUBLICATIONS

Office Action issued Dec. 1, 2015 in Japanese Patent Application No. 2013-040614.
Extended European Search Report issued Jul. 22, 2016 in European Patent Application No. 14756857.0.

* cited by examiner

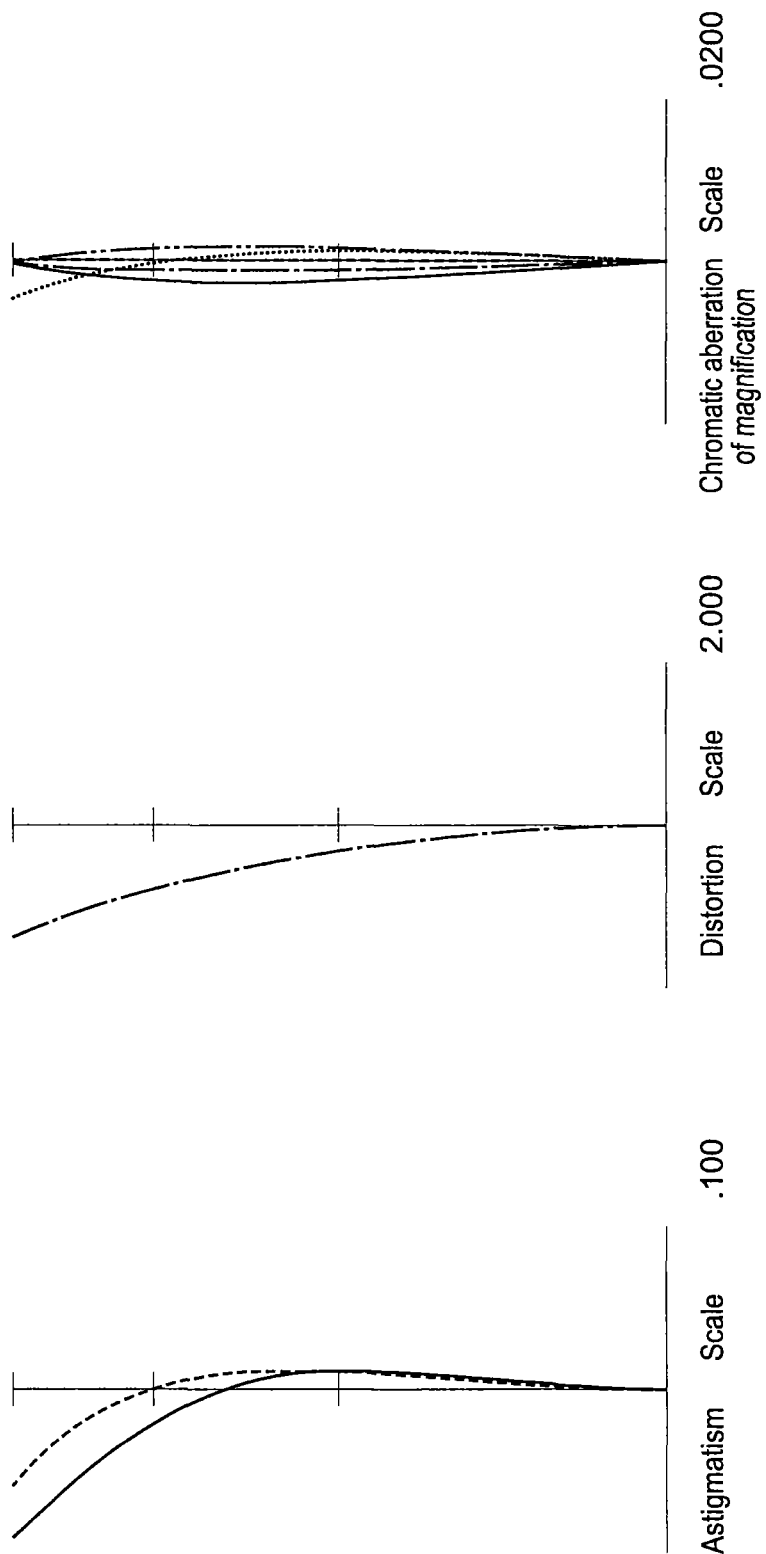

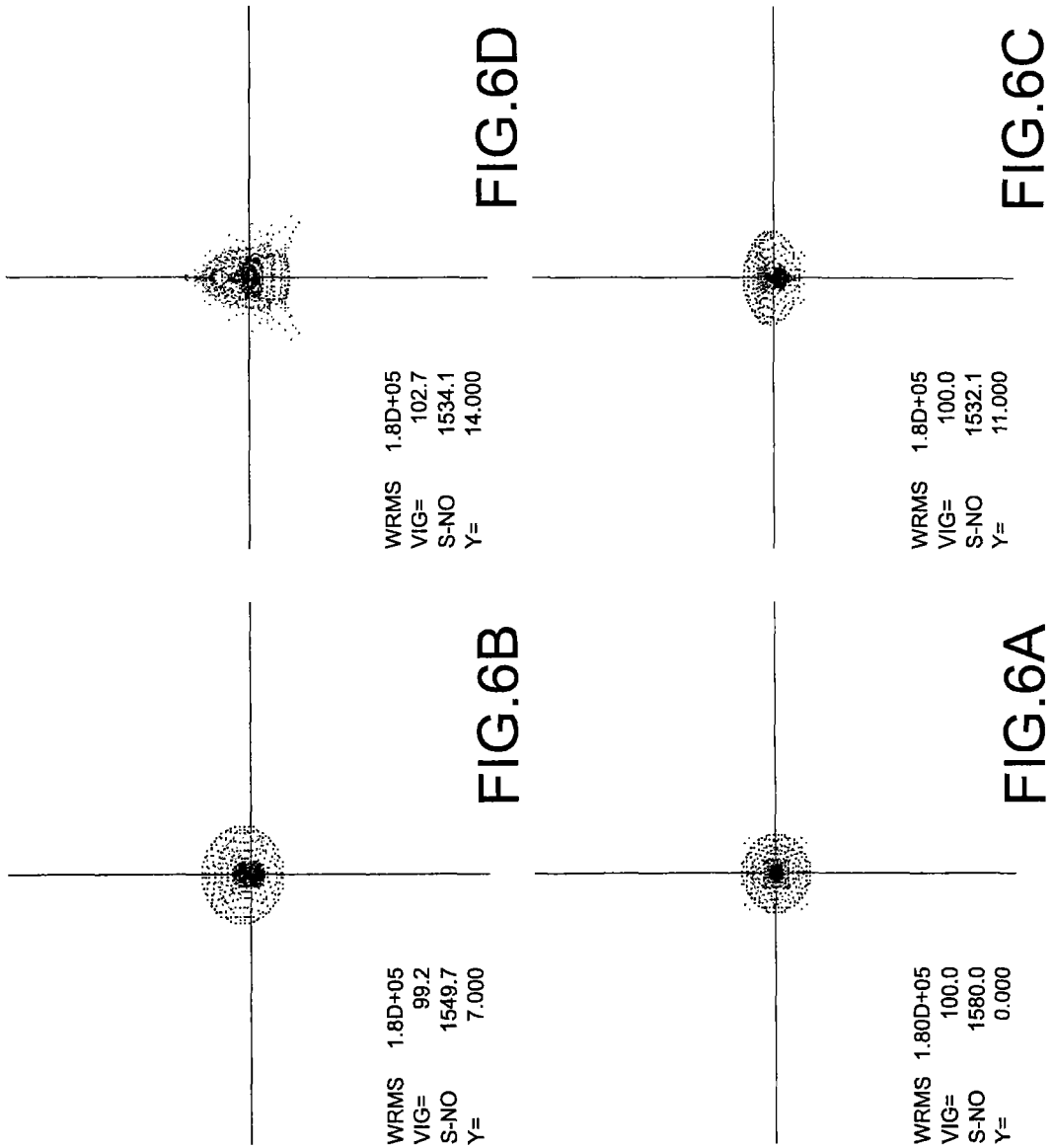

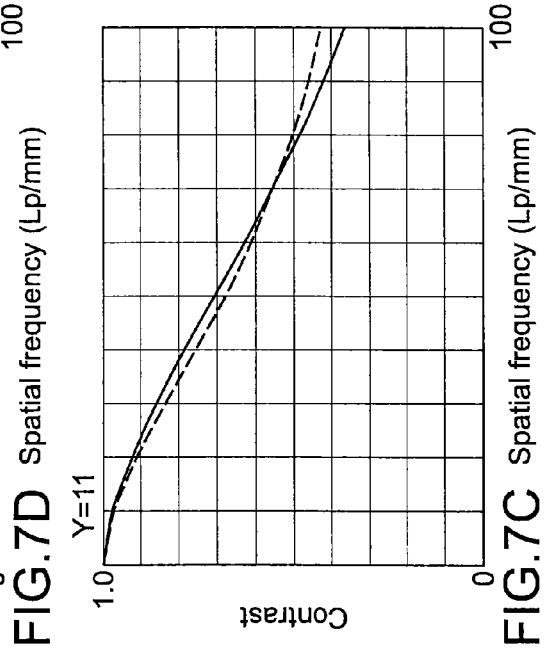
FIG. 7D
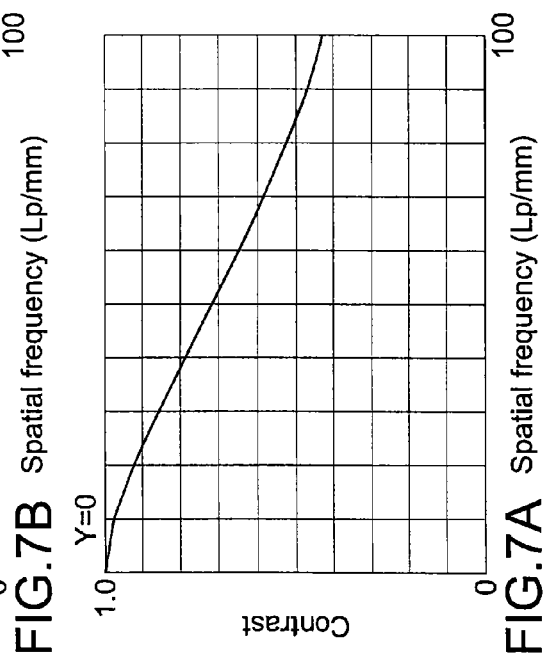
FIG. 7C
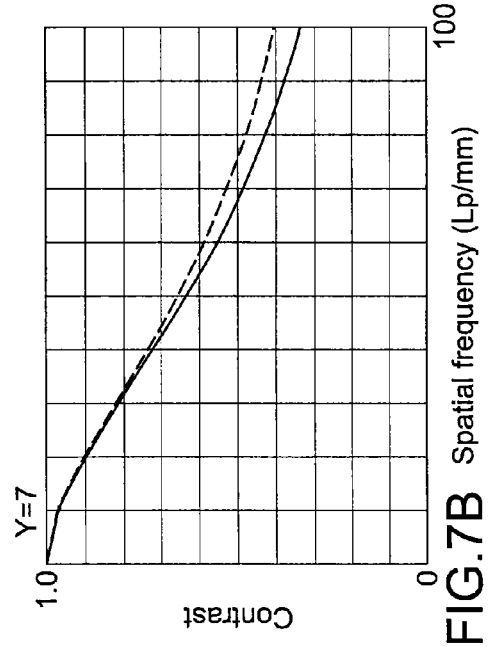
FIG. 7B
FIG. 7A

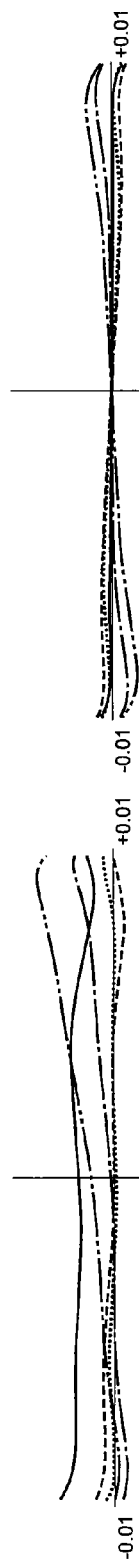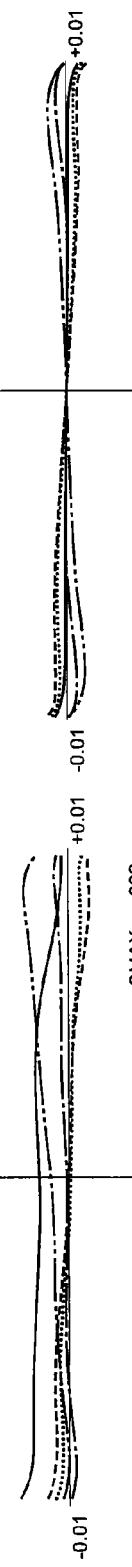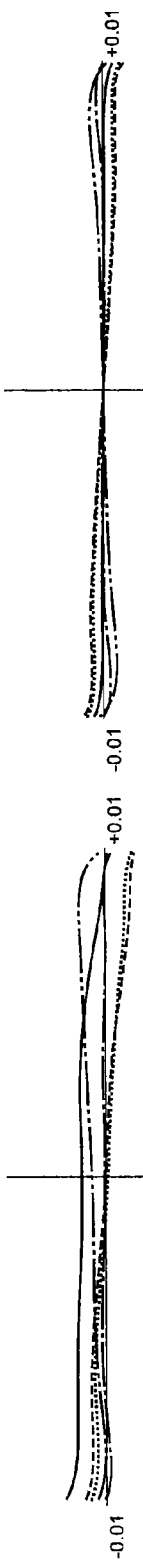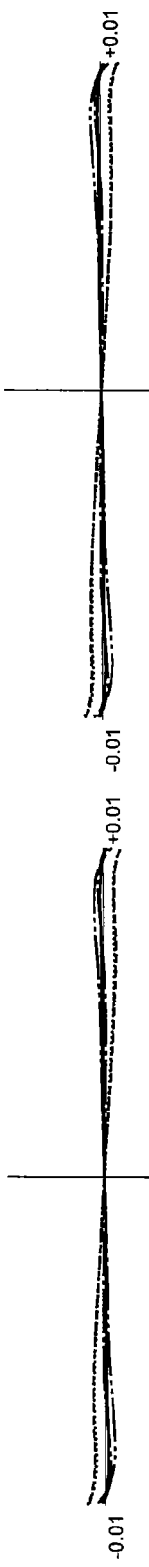
FIG.10A  FIG.10B  FIG.10C  FIG.10D  FIG.10E  FIG.10F  FIG.10G  FIG.10H

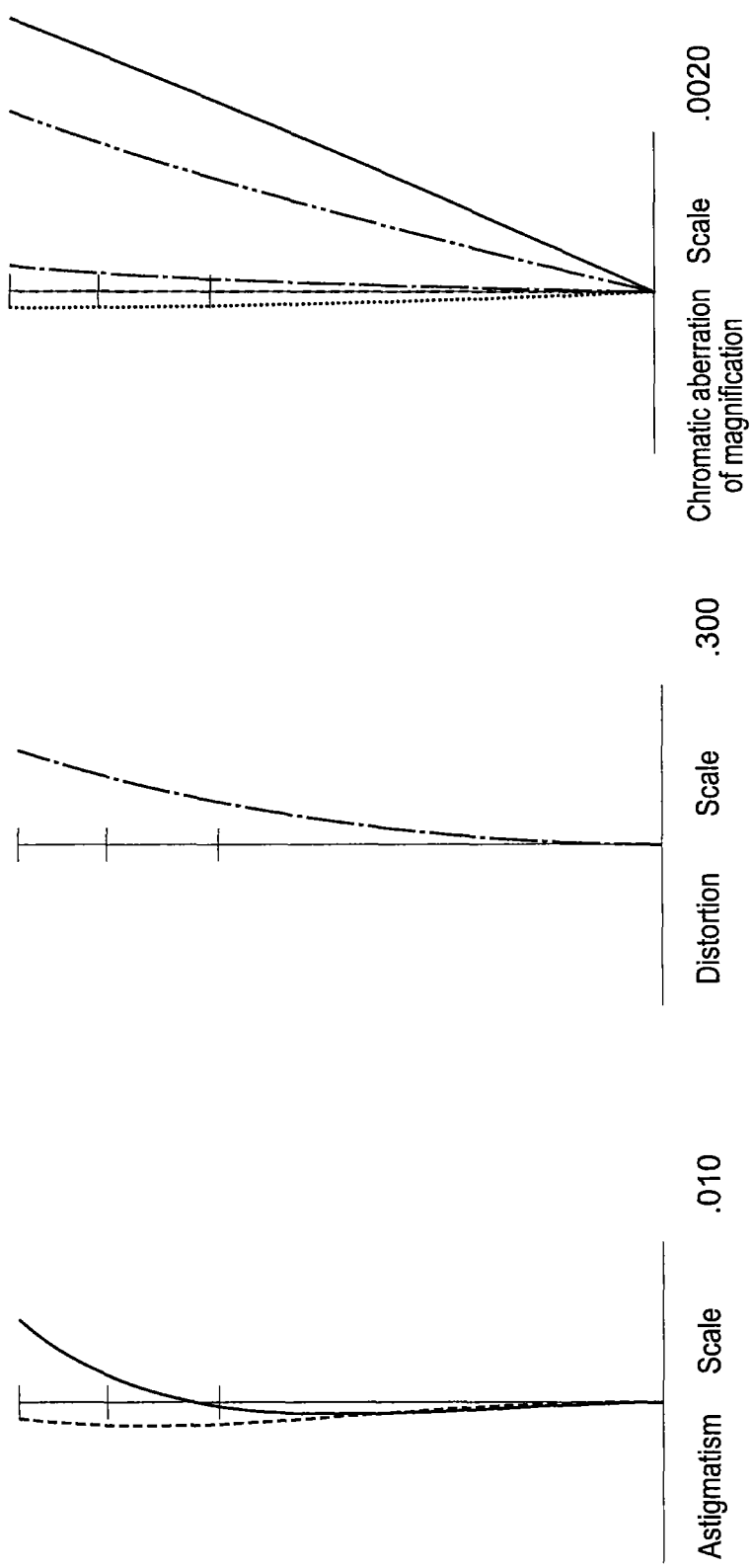

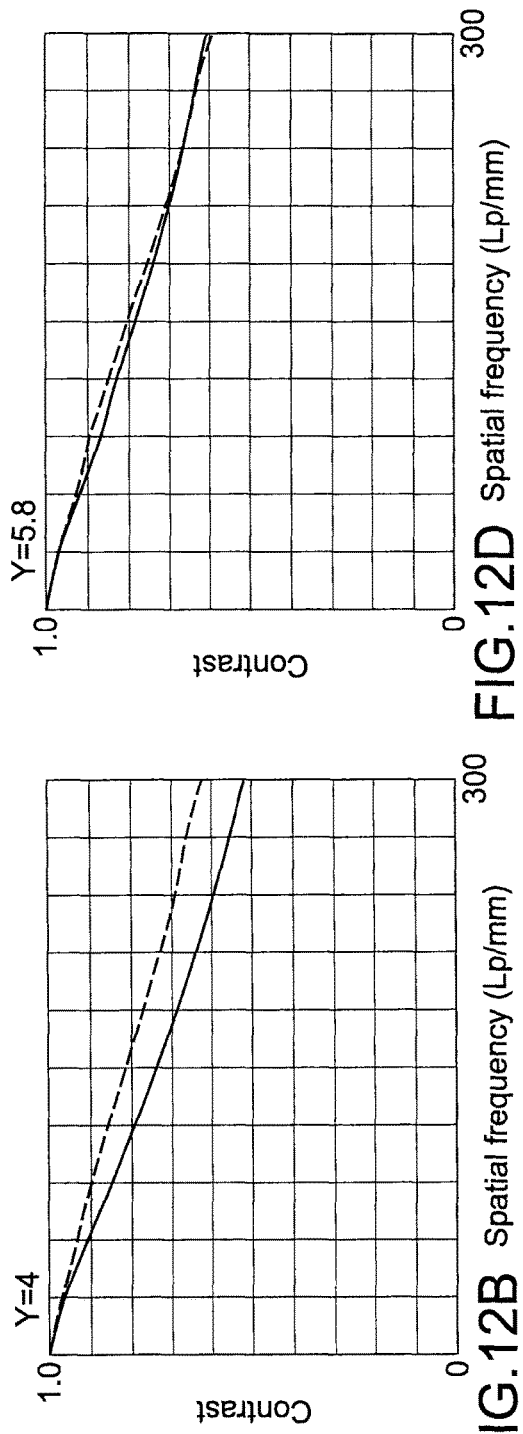
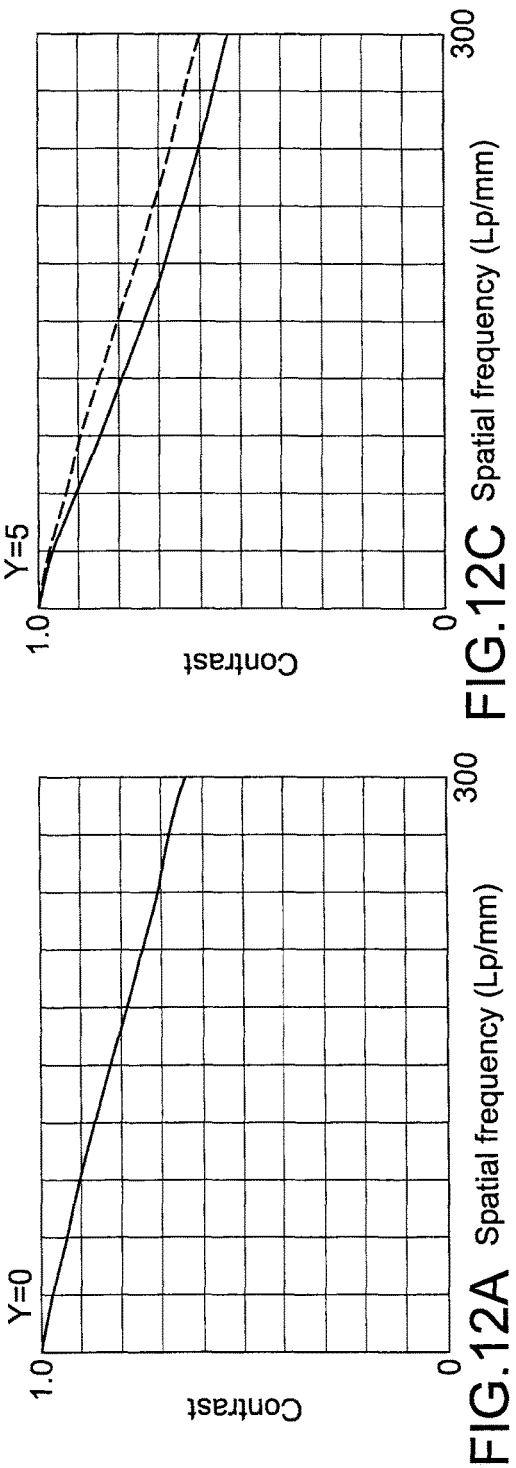
FIG.12B  Y=4
FIG.12A  Y=0
FIG.12D  Y=5.8
FIG.12C  Y=5

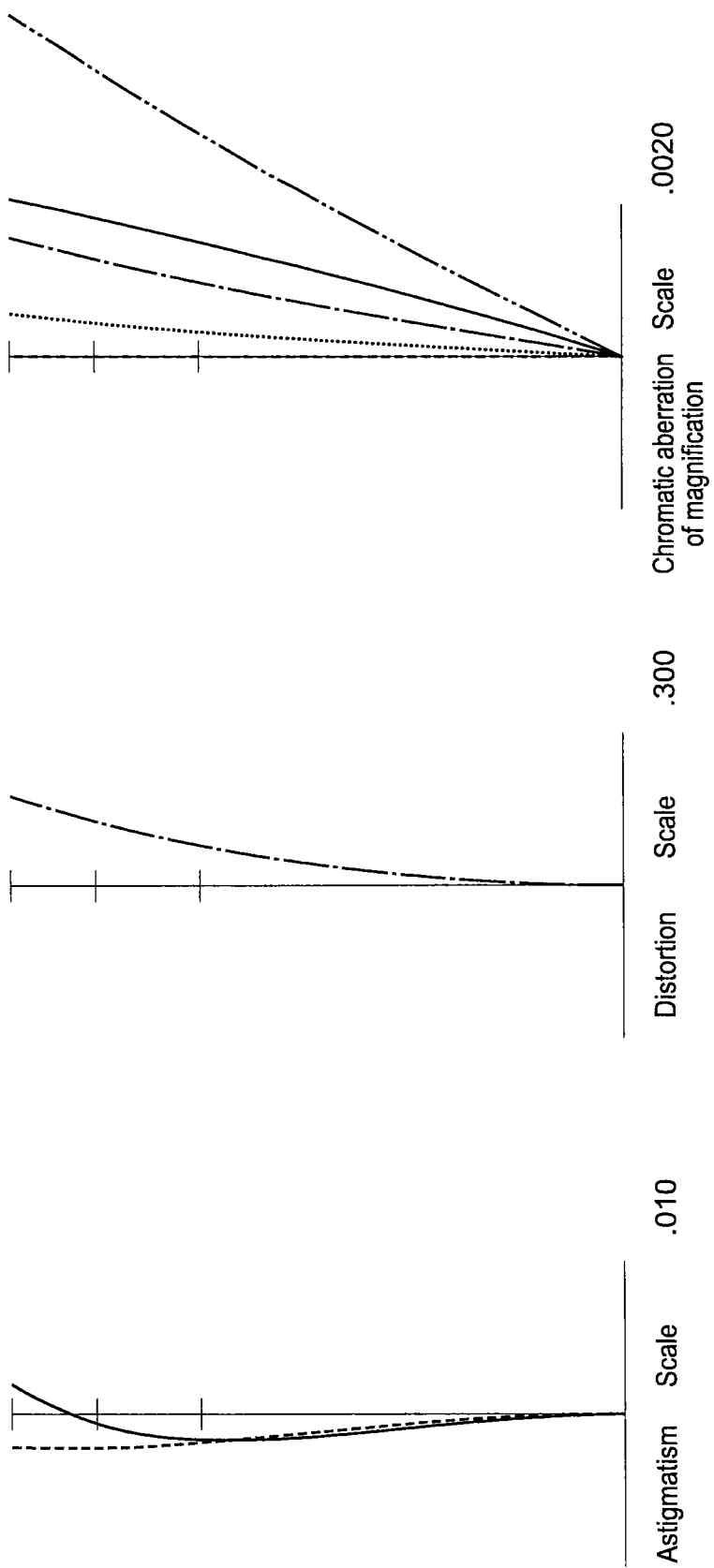

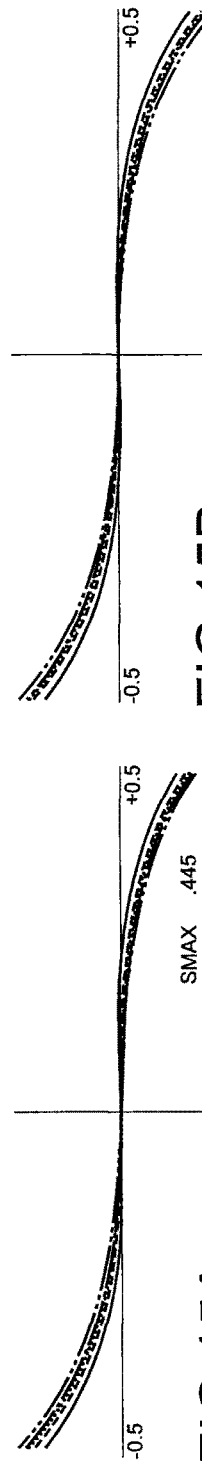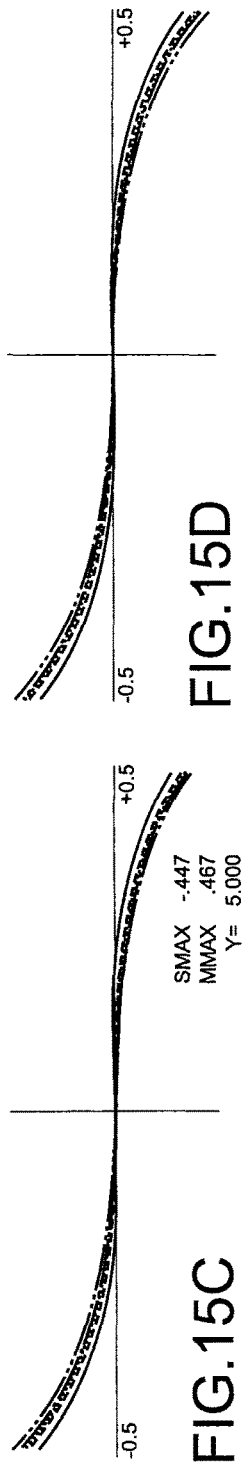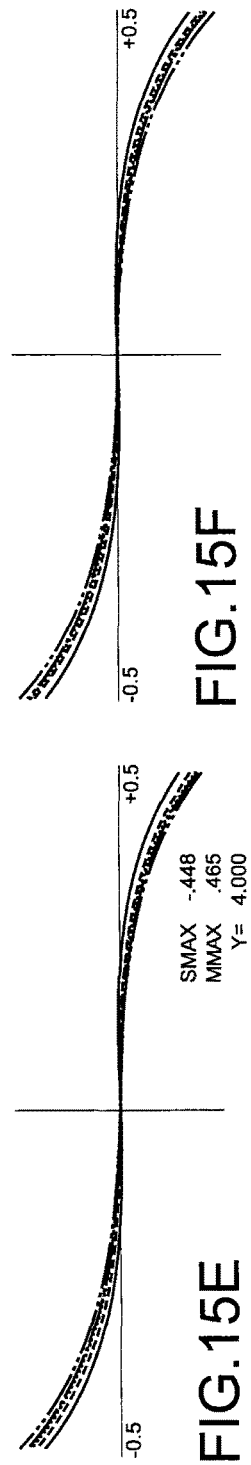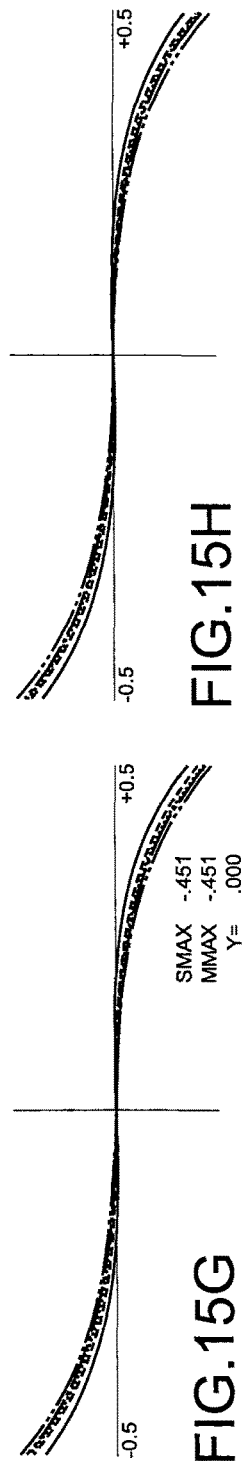

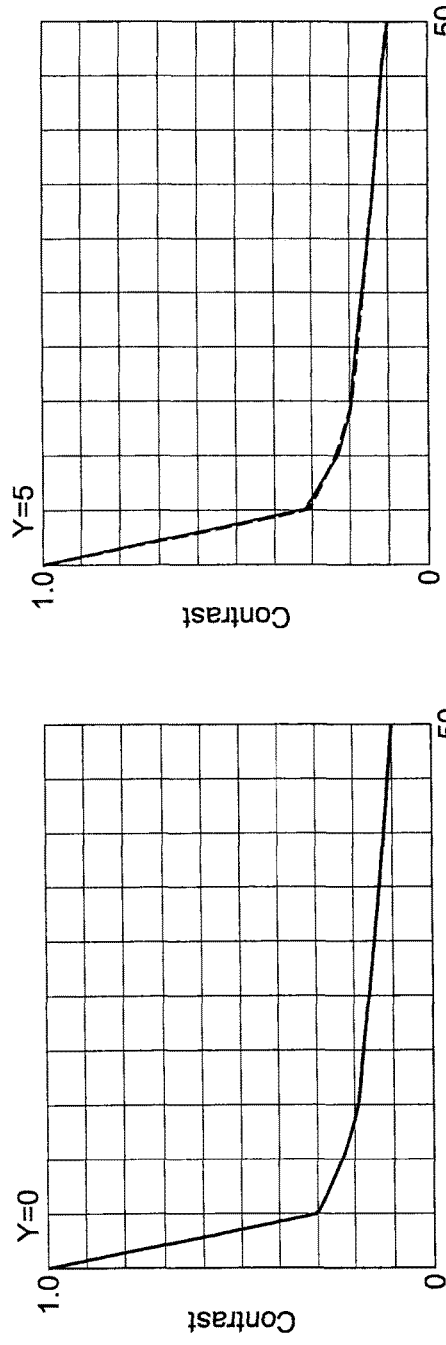
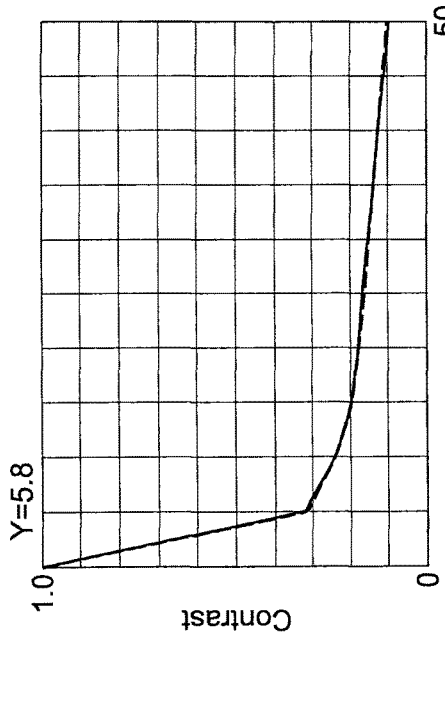
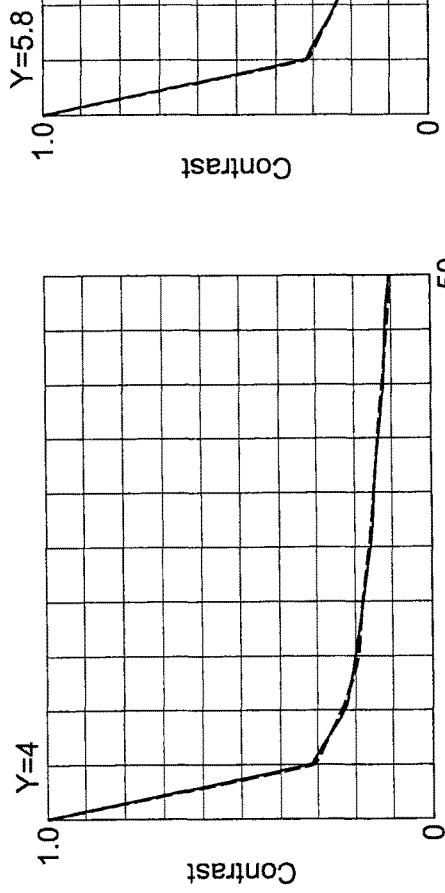
FIG.16D  FIG.16C  FIG.16B  FIG.16A

REAR CONVERSION LENS

TECHNICAL FIELD

The present technology relates to a rear conversion lens, and especially relates to a rear conversion lens with which an image-pickup lens for a three-chip camera is used with a single-chip color camera.

BACKGROUND ART

In the past, a rear conversion lens is used to magnify the focal length of an image-pickup lens (for example, see Patent Document 1 and Patent Document 2).

Further, as another usage of a rear conversion lens, it is desirable to provide a rear conversion lens, which is to be arranged between an image-pickup lens and a camera having different standards and to be used, in order to use the image-pickup lens and the camera in combination.

For example, there is a need to use a ⅔-inch-format zoom lens with a single-chip color camera including an APS-C size image sensor, and there is a need to use the same ⅔-inch-format image-pickup lens with a super-35-mm-format single-chip cinema camera.

Patent Document 1: Japanese Patent Application Laid-open No. 2005-107261

Patent Document 2: Japanese Patent Application Laid-open No. 2006-349904

SUMMARY OF INVENTION

Problem to be Solved by the Invention

However, for example, some ⅔-inch-format image-pickup lenses are designed based on the assumption that they are used with three-chip cameras with color-separation prisms. If such an image-pickup lens is used with a single-chip color camera, since there is no color-separation prism, which is the assumption of the designing, a spherical aberration occurs in large amounts and it is therefore difficult to use them in combination.

In other words, it is not possible to use such a ⅔-inch-format image-pickup lens and a single-chip color camera, which is designed based on the assumption that it is used without a color-separation prism, in combination only by converting a mount system of the camera, by converting the focal length of the image-pickup lens, or by adjusting the flange focal length or the backfocus.

In view of the circumstances as described above, it is an object of the present technology to provide a rear conversion lens, with which it is possible to use an image-pickup lens for a three-chip camera, which is designed based on the assumption that it is used with a color-separation prism in combination, and a single-chip color camera in combination.

Means for Solving the Problem

In order to achieve the above-mentioned object, according to an embodiment of the present technology, a rear conversion lens includes: a chassis including two opposite ends, the chassis including light-transmitting holes on the ends, respectively; a first coupler configured to detachably couple one of the ends of the chassis with an image field side of an image-pickup lens of a three-chip camera including three first image sensors, the image-pickup lens being designed based on an assumption that the image-pickup lens is to be used with a color-separation prism in combination; a second coupler configured to detachably couple the other end of the chassis with a single-chip color camera including a second image sensor, the second image sensor including an image field larger than an image field of the first image sensors of the three-chip camera; and an optical system including a first lens group, a second lens group, and a third lens group arranged in the chassis in this order from an object side, the first lens group having a negative compound focal length, the second lens group being configured to correct a spherical aberration, the third lens group being configured to form an image.

According to the present technology, because the compound focal length of the first lens group is negative, the rear conversion lens may be downsized while the rear conversion lens is used with an image-pickup lens for a three-chip camera, which is telecentric at the image side, in combination.

In order to achieve the above-mentioned object, according to an embodiment of the present technology, in the rear conversion lens, the first lens group may include first three-bonded lenses, the second lens group may include a concave lens, a convex lens, and second three-bonded lenses in this order from the object side, and the third lens group may include a convex lens.

According to the present technology, because an aberration is corrected precisely by using many lenses, it is possible to correct an aberration more appropriately than another rear conversion lens, which includes fewer lenses and may thus be downsized.

In order to achieve the above-mentioned object, according to an embodiment of the present technology, in the rear conversion lens, a compound focal length of the second three-bonded lenses and the third lens group may be positive.

According to the present technology, because the compound focal length of the second three-bonded lenses and the third lens group is positive, the rear conversion lens may be downsized while the rear conversion lens is used with an image-pickup lens for a three-chip camera, which is telecentric at the image side, in combination.

In order to achieve the above-mentioned object, according to an embodiment of the present technology, in the rear conversion lens, the first three-bonded lenses and the second three-bonded lenses satisfy a conditional expression (1), $$-3.0 < (f2G)/(f1G) < -1.2 \tag{1}$$

where f1G is a compound focal length of the first three-bonded lenses, and f2G is a compound focal length of the second three-bonded lenses.

According to the present technology, because the compound focal length of the first three-bonded lenses and the compound focal length of the second three-bonded lenses are determined such that the conditional expression (1) is satisfied, astigmatism on both a sagittal plane and a meridional plane is within a practical range. Further, it is possible to prevent the image quality of a periphery of an image sensor from being degraded.

In order to achieve the above-mentioned object, according to an embodiment of the present technology, in the rear conversion lens, the first three-bonded lenses may satisfy a conditional expression (2), $$n1G1 > n1G3 > n1G2 \tag{2}$$

where $n1G1$ is a refractive index of a first lens of the first three-bonded lenses from the object side, $n1G2$ is a refractive index of a second lens of the first three-bonded lenses from the object side, and n1G3 is a refractive index of a third lens of the first three-bonded lenses from the object side.

According to the present technology, because the refractive indexes of the respective lenses of the first three-bonded lenses are determined such that the conditional expression (2) is satisfied, it is possible to generate a high-order spherical aberration, to control spherical aberration of the image-pickup lens for a three-chip camera, and to increase the image quality.

In order to achieve the above-mentioned object, according to an embodiment of the present technology, in the rear conversion lens, the second three-bonded lenses may satisfy conditional expressions (3) and (4), $$n2G2 > n2G1 \quad (3)$$

$$n2G2 > n2G3 \quad (4)$$

where n2G1 is a refractive index of a first lens of the second three-bonded lenses from the object side, n2G2 is a refractive index of a second lens of the second three-bonded lenses from the object side, and n2G3 is a refractive index of a third lens of the second three-bonded lenses from the object side.

According to the present technology, because the refractive indexes of the respective lenses of the second three-bonded lenses are determined such that the conditional expressions (3) and (4) are satisfied, it is possible to generate a high-order spherical aberration, to control spherical aberration of the image-pickup lens for a three-chip camera, and to increase the image quality.

Effect of the Invention

As described above, according to the present technology, it is possible to use an image-pickup lens for a three-chip camera, which is designed based on the assumption that it is used with a color-separation prism in combination, and a single-chip color camera in combination.

BRIEF DESCRIPTION OF DRAWINGS

FIG. 5A Diagram showing astigmatism of the optical system of the rear conversion lens of the present technology.

FIG. 5B Diagram showing distortion of the optical system of the rear conversion lens of the present technology.

FIG. 5C Diagram showing chromatic aberration of magnification of the optical system of the rear conversion lens of the present technology.

FIG. 6A Spot diagrams of the optical system of the rear conversion lens of the present technology.

FIG. 6B Spot diagrams of the optical system of the rear conversion lens of the present technology.

FIG. 6C Spot diagrams of the optical system of the rear conversion lens of the present technology.

FIG. 6D Spot diagrams of the optical system of the rear conversion lens of the present technology.

FIG. 7A White MTF (Modulation Transfer Function) characteristic diagrams of the optical system of the rear conversion lens of the present technology.

FIG. 7B White MTF (Modulation Transfer Function) characteristic diagrams of the optical system of the rear conversion lens of the present technology.

FIG. 7C White MTF (Modulation Transfer Function) characteristic diagrams of the optical system of the rear conversion lens of the present technology.

FIG. 7D White MTF (Modulation Transfer Function) characteristic diagrams of the optical system of the rear conversion lens of the present technology.

FIG. 10A Coma aberration diagrams of the image-pickup lens for a three-chip camera with a color-separation prism.

FIG. 10B Coma aberration diagrams of the image-pickup lens for a three-chip camera with a color-separation prism.

FIG. 10C Coma aberration diagrams of the image-pickup lens for a three-chip camera with a color-separation prism.

FIG. 10D Coma aberration diagrams of the image-pickup lens for a three-chip camera with a color-separation prism.

FIG. 10E Coma aberration diagrams of the image-pickup lens for a three-chip camera with a color-separation prism.

FIG. 10F Coma aberration diagrams of the image-pickup lens for a three-chip camera with a color-separation prism.

FIG. 10G Coma aberration diagrams of the image-pickup lens for a three-chip camera with a color-separation prism.

FIG. 10H Coma aberration diagrams of the image-pickup lens for a three-chip camera with a color-separation prism.

FIG. 11A Diagram showing astigmatism of the image-pickup lens for a three-chip camera with a color-separation prism.

FIG. 11B Diagram showing distortion of the image-pickup lens for a three-chip camera with a color-separation prism.

FIG. 11C Diagram showing chromatic aberration of magnification of the image-pickup lens for a three-chip camera with a color-separation prism.

FIG. 12A White MTF characteristic diagrams of the image-pickup lens for a three-chip camera with a color-separation prism.

FIG. 12B White MTF characteristic diagrams of the image-pickup lens for a three-chip camera with a color-separation prism.

FIG. 12C White MTF characteristic diagrams of the image-pickup lens for a three-chip camera with a color-separation prism.

FIG. 12D White MTF characteristic diagrams of the image-pickup lens for a three-chip camera with a color-separation prism.

FIG. 14A Diagram showing astigmatism of the image-pickup lens for a three-chip camera without a color-separation prism.

FIG. 14B Diagram showing distortion of the image-pickup lens for a three-chip camera without a color-separation prism.

FIG. 14C Diagram showing chromatic aberration of magnification of the image-pickup lens for a three-chip camera without a color-separation prism.

FIG. 15A Coma aberration diagrams of the image-pickup lens for a three-chip camera without a color-separation prism.

FIG. 15B Coma aberration diagrams of the image-pickup lens for a three-chip camera without a color-separation prism.

FIG. 15C Coma aberration diagrams of the image-pickup lens for a three-chip camera without a color-separation prism.

FIG. 15D Coma aberration diagrams of the image-pickup lens for a three-chip camera without a color-separation prism.

FIG. 15E Coma aberration diagrams of the image-pickup lens for a three-chip camera without a color-separation prism.

FIG. 15F Coma aberration diagrams of the image-pickup lens for a three-chip camera without a color-separation prism.

FIG. 15G Coma aberration diagrams of the image-pickup lens for a three-chip camera without a color-separation prism.

FIG. 15H Coma aberration diagrams of the image-pickup lens for a three-chip camera without a color-separation prism.

FIG. 16A White MTF characteristic diagrams of the image-pickup lens for a three-chip camera without a color-separation prism.

FIG. 16B White MTF characteristic diagrams of the image-pickup lens for a three-chip camera without a color-separation prism.

FIG. 16C White MTF characteristic diagrams of the image-pickup lens for a three-chip camera without a color-separation prism.

FIG. 16D White MTF characteristic diagrams of the image-pickup lens for a three-chip camera without a color-separation prism.

MODES FOR CARRYING OUT THE INVENTION

Figure 1:
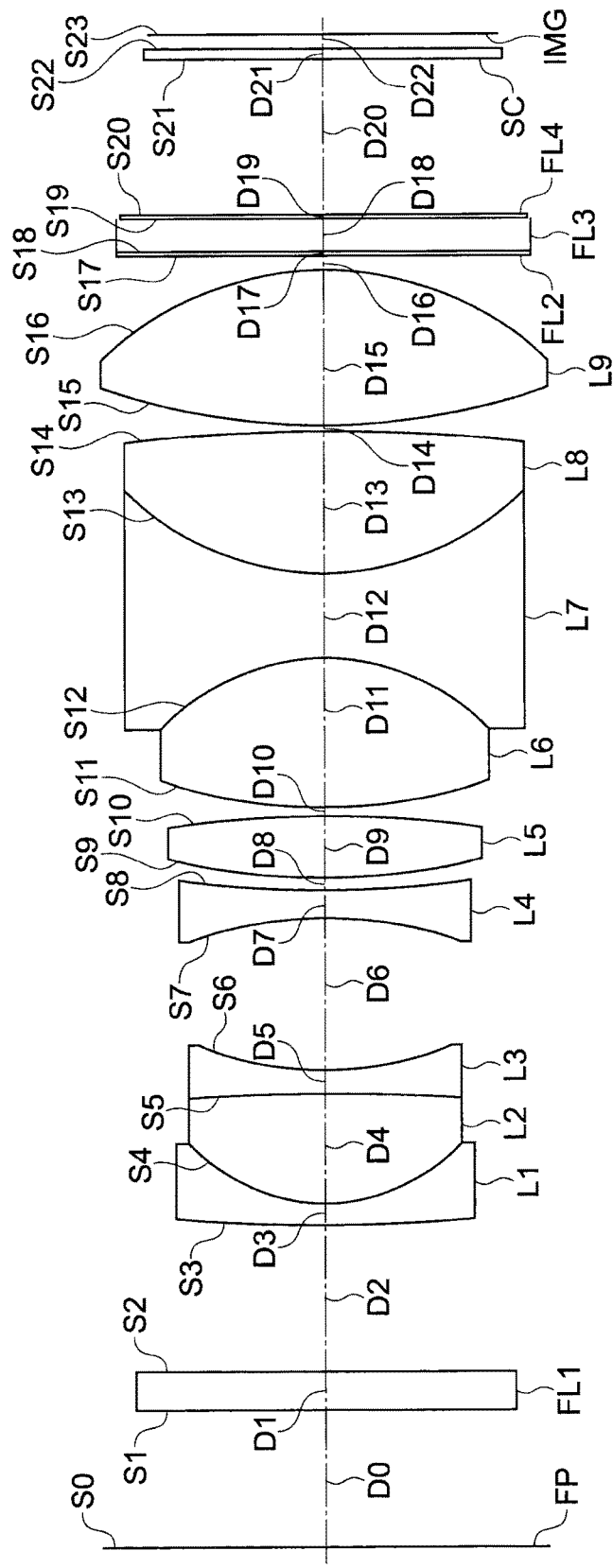
FIG. 1 A cross-sectional view taken along the optical axis of the optical system of a rear conversion lens of the present technology.

Hereinafter, an embodiment of the present technology will be described with reference to the drawings.

[Features of the Present Technology]

(Correction of Spherical Aberration and Longitudinal Chromatic Aberration)

As described above, a rear conversion lens (hereinafter referred to as the optical system) of the present technology is to be arranged behind an image-pickup lens for a three-chip camera and used. An image-pickup lens for a three-chip camera is designed based on the assumption that it is used with a color-separation prism. For that reason, if an image-pickup lens for a three-chip camera is used with a single-chip color camera without a color-separation prism in combination, a spherical aberration largely displaced to an object side will occur because there is no color-separation prism, and a longitudinal chromatic aberration will occur resulting from a difference of a refractive index affected by the wavelength of a prism glass. Since the optical system corrects such aberrations, the aberration shape when an image-pickup lens for a three-chip camera is used with a single-chip color camera in combination is substantially equivalent to the aberration shape when an image-pickup lens for a three-chip camera is used together with a three-chip camera.

(Magnification of Image Circle)

A typical rear conversion lens is only configured to convert the focal length of an image-pickup lens, and magnifies the image in the vicinity of the center of an image-pickup lens without changing the size of an image circle. In contrast, the optical system is configured to magnify about 2.5 times the diameter of an image circle of the ⅔-inch format to thereby obtain an image circle of the APS-C format. The reason is as follows. While the area of the image field of an image sensor for a three-chip camera is small, there is a need to use an image sensor, whose image field has a larger area, for a single-chip color camera to be used in combination.

The optical system not only simply magnifies an image circle, but also magnifies the above-mentioned aberration shape by a magnification factor. As a result, the entire resolution capability and the entire peripheral brightness of the magnified image field are approximately the same as the resolution capability and the peripheral brightness of the original image field before magnification.

(Telecentricity)

It is assumed that the optical system is used for an image-pickup lens for a three-chip camera, which is telecentric at an image side to solve a color-cast problem of a color-separation prism. Further, because the optical system itself is telecentric at an image side and causes light beams to enter photosensitive elements of an image field perpendicularly, light beams perpendicularly enter color filters of photosensitive elements even of a periphery of an image field. Therefore a captured image is brilliantly colored without murkiness even in its periphery.

[Image-Pickup Lens Assumed to be Used in the Present Technology]

The optical system of the present technology is designed based on the assumption that it is arranged behind an image-pickup lens for a three-chip camera. Originally, an image-pickup lens for a three-chip camera is designed based on the assumption that it is used with a three-chip camera in combination.

Under such a supposition, it is assumed that a color-separation prism and filters, e.g., a quartz filter 3.15 mm, an N-BAF 52 filter 33.02 mm, S-BSL 7 filter 10.05 mm, and the like, i.e., glass members of 40 mm or more in total, exist between an image-pickup lens for a three-chip camera and an image sensor. It should be noted that the flange focal length of an image-pickup lens is, for example, 48 mm (in Air).

For that reason, if the image-pickup lens for a three-chip camera is used with a camera without such glass members, an extremely large aberration (mainly spherical aberration) may occur. In view of the above, it is most important to correct such an aberration when the image-pickup lens for a three-chip camera is used with a single-chip color camera in combination.

[Problem in Using Typical Designing Technique]

Typically, a rear conversion lens (tele conversion lens) is designed based on the assumption that the principal ray is emitted from a negative exit pupil position in a front image-pickup lens. In other words, it is assumed that light beams emitted from an image-pickup lens, whose exit pupil distance is finite negative, enters a rear conversion lens. In addition, the rear conversion lens is designed such that light beams from the rear conversion lens have a finite-negative exit pupil distance, too.

In designing such a rear conversion lens, according to a general basic designing, a group of convex lenses is arranged as lenses closest to the object side, divergent of a principal ray is prevented once, a group of concave lenses are arranged at the image field side of the lens group, light beams are narrowed, and the focal length is thereby made larger.

This basic designing is employed in order to downsize the rear conversion lens. Instead of achievement of downsizing, in general, the exit pupil distance at the image side of the rear conversion lens is smaller than the exit pupil distance of an image-pickup lens.

In a film camera, a rear conversion lens, which makes the exit pupil distance smaller, makes the angle of light beams entering a film surface larger, which is not a problem. However, in a digital camera using an image sensor instead of a film, it is desirable that light beams enter perpendicular to photosensitive elements of the image sensor. However, in a rear conversion lens designed based on a typical technique, the exit pupil distance is shortened, the angle of light beams entering photosensitive elements in a periphery of the image sensor is not perpendicular, and as a result the light amount of a periphery of an image may be insufficient or murkiness may occur.

Particularly, unlike a typical rear conversion lens, it is another object of the present technology to magnify an image circle. If the above-mentioned basic designing is employed, the incident angle of light beams entering photosensitive elements in a periphery of the image sensor is largely different from a perpendicular, which is a problem.

In other words, according to a design constraint for a digital camera, i.e., a digital camera (including cinema camera) using an image sensor to capture an image, the exit pupil position should be at infinity such that light beams perpendicularly enter photosensitive elements even in a periphery of an image sensor.

[Overview of Lens Structure]

FIG. 1 is a cross-sectional view taken along the optical axis of the optical system. A flange plane FP of an image-pickup lens for a three-chip camera is at the left side of FIG. 1, and an image field IMG of the image sensor is at the right side of FIG. 1. Sn is the n-th surface from the object side, Ln is the n-th lens from the object side, Fn is the n-th filter from the object side, and Dn is the n-th distance between surfaces from the object side.

Figure 17:
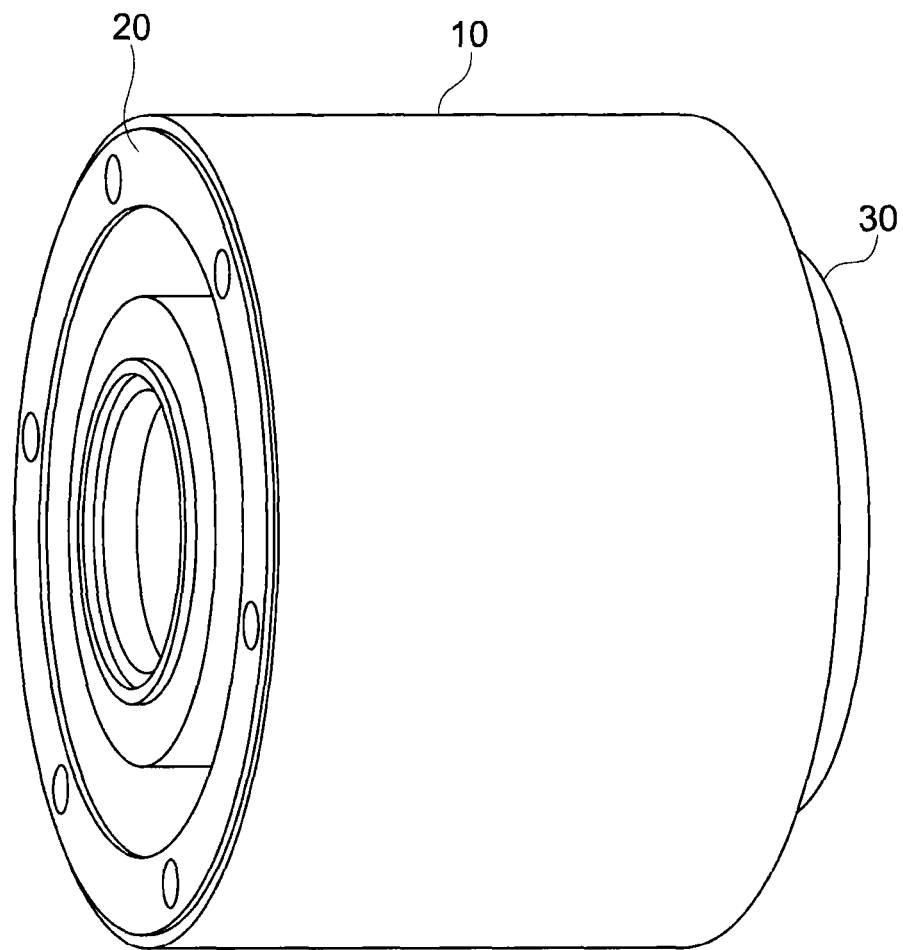
FIG. 17 An outside view showing the rear conversion lens of the present technology.

It should be noted that a filter FL1 functions as a cover glass or an ND (Neutral Density) glass, and each of filters FL2 to FL4 is glass such as a quartz filter or another filter built in a camera. Further, for example, as shown in FIG. 17, the optical system is combined with a chassis 10, which holds the optical system. The chassis 10 includes a first mount (first coupler) 20 at the object side, which is configured to connect the chassis 10 and an image-pickup lens for a three-chip camera, and a second mount (second coupler) 30 at the image field side of the chassis 10, which is configured to connect the chassis 10 and a single-chip color camera.

The optical system is an optical system including three groups of lenses (nine lenses), is designed based on the assumption that light beams entering from an image-pickup lens for a three-chip camera are telecentric, and is optically designed such that light beams are telecentric at the image field side.

The lens structure of the optical system includes, in the stated order from the object side, (1) concave meniscus lens L1 including concave surface facing an image side
(2) biconvex lens L2
(3) biconcave lens L3
(4) biconcave lens L4
(5) biconvex lens L5
(6) biconvex lens L6
(7) biconcave lens L7
(8) biconvex lens L8
(9) biconvex lens L9.

Further, the lenses L1, L2, and L3 are bonded together, and a concave lens group of three-bonded lenses (first lens group, first three-bonded lenses) is thereby formed.

Further, the lenses L6, L7, and L8 are bonded together, an afocal lens group of three-bonded lenses (second three-bonded lenses) is thereby formed, and the afocal lens group and the single lenses L4 and L5 form an aberration correction group (second lens group).

A single lens L9 forms a convex lens group (third lens group) configured to form an image.

The optical system employs, as a method of correcting a spherical aberration, which occurs in large amounts when an image-pickup lens for a three-chip camera is used without a color-separation prism, a method of bonding pieces of glass, each of which has a large curvature and different refractive index, thereby generating a high-order spherical aberration, and correcting the spherical aberration of the image-pickup lens for a three-chip camera.

[Requirements]

The requirements of the optical system are as follows.

(First Requirement)

As the first requirement, the compound focal length of the first lens group, i.e., the first three-bonded lenses including the bonded lenses L1 to L3, should be negative.

This requirement is effective to downsize the optical system, i.e., a magnifying optical system to be combined with an image-pickup lens for a three-chip camera, which is telecentric at the image side. Further, this requirement is effective to, when the image-pickup lens for a three-chip camera, which is telecentric at the image side, is used, make the optical system to be telecentric at the image side. Also from a viewpoint of magnification of an image, which is an object of the optical system, the focal length of the first lens group should be negative.

Because the exit pupil distance of a typical image-pickup lens is negative, if the focal length of the first lens group at the rear conversion lens side is negative, the rear lenses of the second lens group and the latter are too large to use. The optical system solves this problem.

If the compound focal length is positive, then a sufficient magnification factor cannot be obtained, an image field curvature aberration is increased, and a high-performance optical system cannot thus be obtained. Unlike an existing rear conversion lens, whose image circle is constant in size even if an image is magnified, the optical system magnifies an image circle to occupy a larger area and is largely affected by an image field curvature aberration. For that reason, this requirement is important to reduce an image field curvature aberration.

(Second Requirement)

As the second requirement, the compound focal length of the second three-bonded lenses and the third lens group, i.e., the lenses L6 to L9, should be positive.

Similar to the above-mentioned requirement, this requirement is effective to downsize the optical system, i.e., a magnifying optical system to be combined with an image-pickup lens for a three-chip camera, which is telecentric at the image side. The negative focal length of the first lens group and the positive focal length of the second lens group are essential requirements to downsize the optical system.

If the compound focal length is negative, then the optical system cannot be telecentric at the image field side, an image field curvature aberration is increased, and a high-performance optical system cannot thus be obtained.

(Third Requirement)

As the third requirement, the following conditional expression (1) should be satisfied.

$$-3.0 < (f2G)/(f1G) < -1.2 \quad (1)$$

Where f1G is the compound focal length of the first three-bonded lenses, and f2G is the compound focal length of the second three-bonded lenses.

If the value (f2G)/(f1G) is equal to or larger than −1.2, then astigmatism on both a sagittal plane and a meridional plane is largely displaced to the object side, the image quality of a periphery of an image sensor is degraded, and the optical system is thus not practical.

In addition, if the value (f2G)/(f1G) is equal to or smaller than −3.0, then astigmatism on a meridional plane is displaced to the object side, astigmatism on a sagittal plane is displaced to the image field side, the image quality of the periphery is degraded, and the optical system is thus not practical.

(Fourth Requirement)

As the fourth requirement, the following conditional expression (2) should be satisfied.

$$n1G1 > n1G3 > n1G2 \quad (2)$$

Where: n1G1 is the refractive index of the lens L1 of the first three-bonded lenses, which is the first lens from the object side; n1G2 is the refractive index of the lens L2 of the first three-bonded lenses, which is the second lens from the object side; and n1G3 is the refractive index of the lens L3 of the first three-bonded lenses, which is the third lens from the object side.

As described above, this requirement is necessary to generate a high-order spherical aberration of the first lens group, to control spherical aberration of the image-pickup lens for a three-chip camera, and to increase the image quality. The smallest refractive index (n1G2) of the central lens L2 out of the refractive indexes of the three lenses is an absolute requirement. The requirement, in which the refractive index (n1G1) of the lens L1 closest to the object side out of the three lenses is larger than the refractive index (n1G3) of the lens L3 closest to the image field, is defined based on the design condition of the currently-assumed image-pickup lens for a three-chip camera.

If this requirement is not satisfied, then it is not possible to correct a high-order aberration and a low-order aberration in a balanced manner and to attain a sufficient resolution.

(Fifth Requirement)

As the fifth requirement, the following conditional expressions (3) and (4) should be satisfied.

$$n2G2 > n2G1 \quad (3)$$

$$n2G2 > n2G3 \quad (4)$$

Where: n2G1 is the refractive index of the lens L6 of the second three-bonded lenses, which is the first lens from the object side; n2G2 is the refractive index of the lens L7 of the second three-bonded lenses, which is the second lens from the object side; and n2G3 is the refractive index of the lens L8 of the second three-bonded lenses, which is the third lens from the object side.

Similar to the above-mentioned fourth requirement, this requirement is necessary to generate a high-order spherical aberration of the second three-bonded lenses, to control spherical aberration of the image-pickup lens for a three-chip camera, and to increase the image quality. The highest refractive index (n2G2) of the central lens L7 out of the refractive indexes of the three lenses is a typical requirement to control a spherical aberration.

If this requirement is not satisfied, then it is not possible to correct a high-order aberration and a low-order aberration in a balanced manner and to attain a sufficient resolution.

[Lens Surface Data]

Specific numerical examples of lens surface data are as follows, where R is a curvature radius of each lens surface (optical surface), D is a distance on the optical axis between lens surfaces, Nd is a refractive index with respect to the d-line (587.6 nm) of each lens or filter (optical medium), and Vd is an Abbe number of the d-line of each lens (optical medium). Note that the curvature radius R, the distance between surfaces D, and an effective radius are measured in millimeters (mm).

(Lens surface data)

| Surface No. | R | D | Nd | Vd | Effective radius | Notes |
|---|---|---|---|---|---|---|
| 0 |  | 10.00 |  |  |  | image-pickup lens flange plane FP |
| 1 | ∞ | 3.00 | 1.517 | 64.20 | 17.9 | filter, etc. FL1 |
| 2 | ∞ | 10.60 |  |  |  |  |
| 3 | 156.00 | 1.70 | 1.883 | 40.80 | 13.6 | 1st lens L1 |
| 4 | 18.40 | 8.20 | 1.640 | 34.57 | 12.4 | 2nd lens L2 |
| 5 | −200.90 | 1.70 | 1.729 | 54.67 | 12.0 | 3rd lens L3 |
| 6 | 35.85 | 11.17 |  |  | 11.5 |  |
| 7 | −42.50 | 2.00 | 1.729 | 54.67 | 11.9 | 4th lens L4 |
| 8 | 100.30 | 1.00 |  |  | 12.5 |  |
| 9 | 64.40 | 4.50 | 1.620 | 36.30 | 13.1 | 5th lens L5 |
| 10 | −125.00 | 0.71 |  |  | 13.4 |  |
| 11 | 52.20 | 11.00 | 1.593 | 35.45 | 13.9 | 6th lens L6 |
| 12 | −22.35 | 6.30 | 1.834 | 37.34 | 13.9 | 7th lens L7 |
| 13 | 27.80 | 10.50 | 1.541 | 47.00 | 15.3 | 8th lens L8 |
| 14 | −168.00 | 0.51 |  |  | 16.6 |  |
| 15 | 69.50 | 11.50 | 1.518 | 58.96 | 17.9 | 9th lens L9 |
| 16 | −31.74 | 1.00 |  |  | 18.3 |  |
| 17 | ∞ | 0.25 | 1.523 | 59.44 | 17.7 | filter, etc. FL2 |
| 18 | ∞ | 2.50 | 1.549 | 69.92 | 17.7 | filter, etc. FL3 |
| 19 | ∞ | 0.30 | 1.517 | 64.20 | 17.7 | filter, etc. FL4 |
| 20 | ∞ | 11.56 |  |  | 16.5 |  |
| 21 | ∞ | 0.70 | 1.517 | 64.20 | 16.5 | sensor cover SC |

-continued (Lens surface data)

| Surface No. | R | D | Nd | Vd | Effective radius | Notes |
|---|---|---|---|---|---|---|
| 22 | ∞ | 1.00 | | | 16.5 | |
| 23 | ∞ | 0.00 | | | 28.0 | image field IMG |

[Optical Path Diagram, Aberration Diagrams, and the Like]

Figure 2:
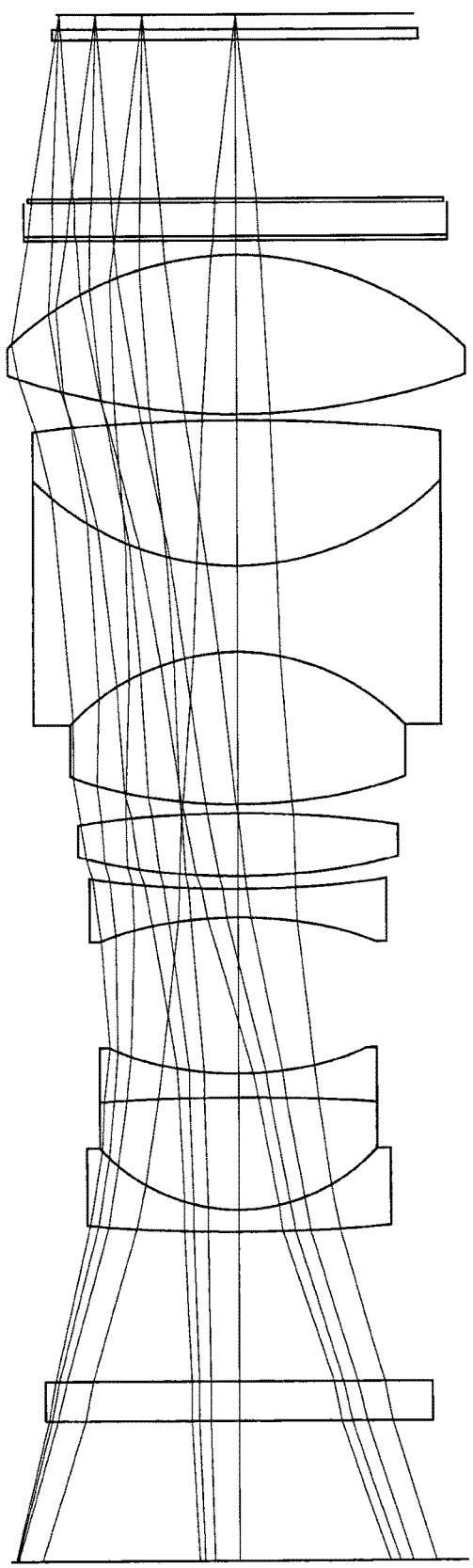
FIG. 2 An optical path diagram of the optical system of the rear conversion lens of the present technology.
Figure 3:
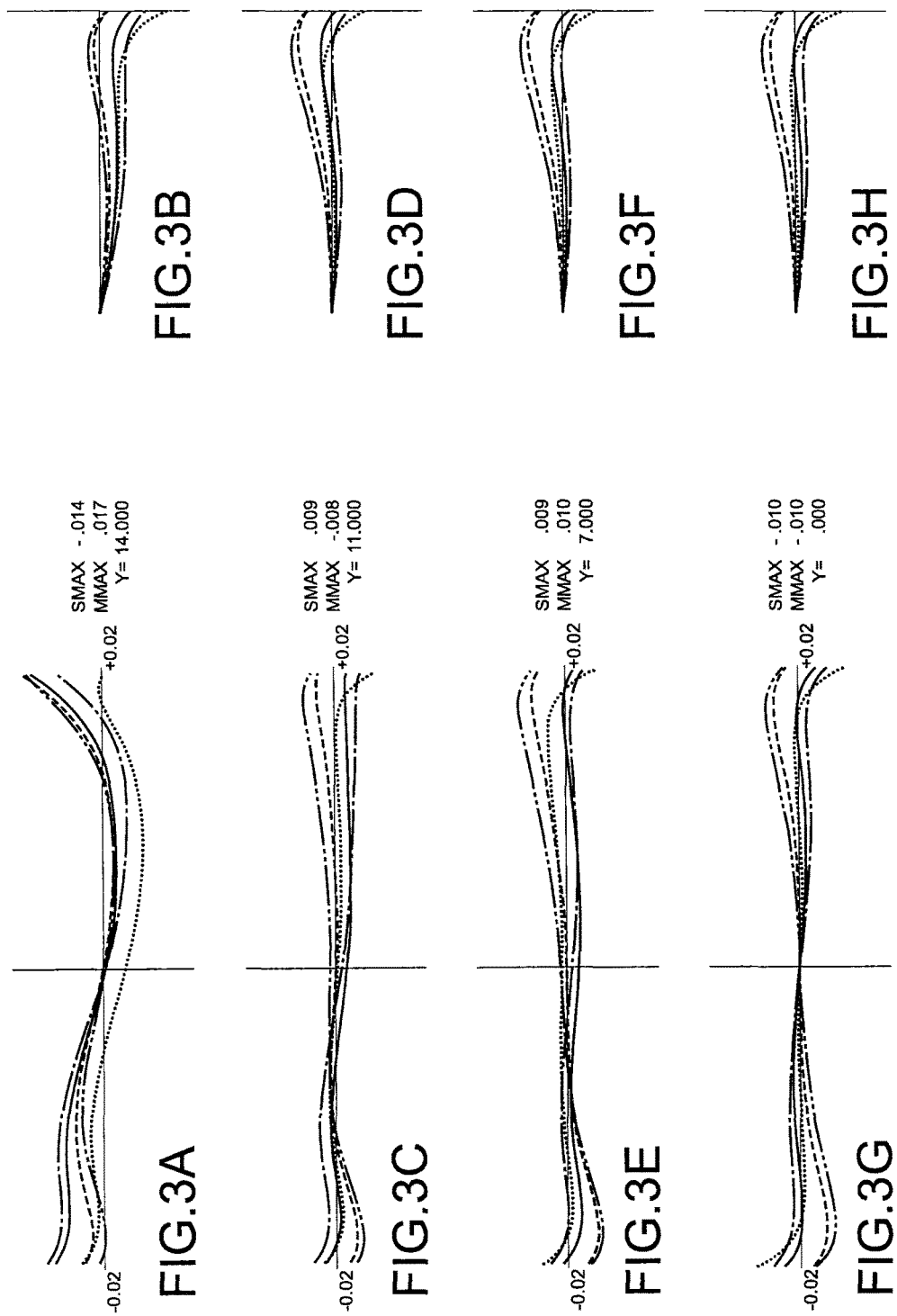
FIG. 3A Coma aberration diagrams of the optical system of the rear conversion lens of the present technology.
FIG. 3B Coma aberration diagrams of the optical system of the rear conversion lens of the present technology.
FIG. 3C Coma aberration diagrams of the optical system of the rear conversion lens of the present technology.
FIG. 3D Coma aberration diagrams of the optical system of the rear conversion lens of the present technology.
FIG. 3E Coma aberration diagrams of the optical system of the rear conversion lens of the present technology.
FIG. 3F Coma aberration diagrams of the optical system of the rear conversion lens of the present technology.
FIG. 3G Coma aberration diagrams of the optical system of the rear conversion lens of the present technology.
FIG. 3H Coma aberration diagrams of the optical system of the rear conversion lens of the present technology.

Here, description will be made with reference to an optical path diagram, aberration diagrams, and the like. FIG. 2 is an optical path diagram of the optical system. As to aberration diagrams, aberration diagrams of the optical system will be provided first, and aberration diagrams of an image-pickup lens for a three-chip camera, in which the optical system is to be used, with a color-separation prism will be provided next. Finally, aberration diagrams of the image-pickup lens for a three-chip camera without a color-separation prism will be provided.

For example, the scale difference between coma aberration diagrams of an image-pickup lens for a three-chip camera with a color-separation prism and coma aberration diagrams of an image-pickup lens for a three-chip camera without a color-separation prism is one of the important points. Since the scale of the former is ±0.01 mm and the scale of the latter is ±0.5 mm, it can be seen that the order of a coma aberration with a color-separation prism is fifty times as large as the order of a coma aberration without a color-separation prism.

FIG. 3A to FIG. 3H show coma aberration diagrams of the optical system, in which the drawing scale is ±0.02 mm. FIGS. 3A, 3C, 3E, and 3G show meridional planes, and FIGS. 3B, 3D, 3F, and 3H show sagittal planes. In order of FIGS. 3A and 3B, 3C and 3D, 3E and 3F, 3G and 3H, aberrations are 14 mm, 11 mm, 7 mm, and 0 mm in image height.

Figure 4:
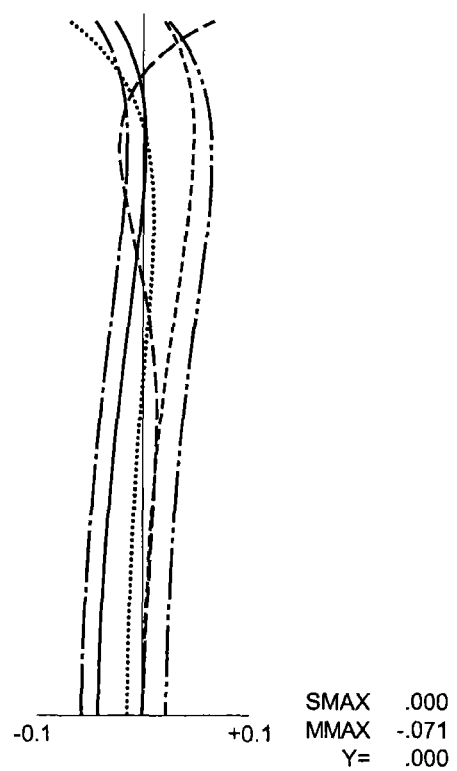
FIG. 4 A spherical aberration diagram of the optical system of the rear conversion lens of the present technology.

FIG. 4 is a spherical aberration diagram of the optical system, in which the perpendicular axis represents a light beam height and the horizontal axis represents a distance in the optical axis direction. The drawing scale is ±0.1 mm.

FIGS. 5A, 5B, and 5C show, starting from the left, astigmatism, distortion, and chromatic aberration of magnification of the optical system. In the astigmatism diagram, the perpendicular axis represents an image height, and the horizontal axis represents a defocusing amount. In the distortion diagram, the perpendicular axis represents an image height, and the horizontal axis represents an amount of a distortion of an image. The drawing scales are ±0.1 mm, ±2%, and ±0.02 mm, respectively. In the astigmatism diagram, the solid line represents the meridional direction, and the dashed line represents the sagittal direction.

FIGS. 6A, 6B, 6C, and 6D show spot diagrams of the optical system, in which the drawing scale between the center of each cross and each end thereof is 0.05 mm. FIG. 6A represents the image height of 0 mm, FIG. 6B represents the image height of 7 mm, FIG. 6C represents the image height of 11 mm, and FIG. 6D represents the image height of 14 mm.

FIGS. 7A, 7B, 7C, and 7D show white MTF (Modulation Transfer Function) characteristic diagrams of the optical system, in which the perpendicular axis represents a contrast (modulation), and the horizontal axis represents a spatial frequency. FIG. 7A represents the image height of 0 mm, FIG. 7B represents the image height of 7 mm, FIG. 7C represents the image height of 11 mm, and FIG. 7D represents the image height of 14 mm.

Figure 8B:
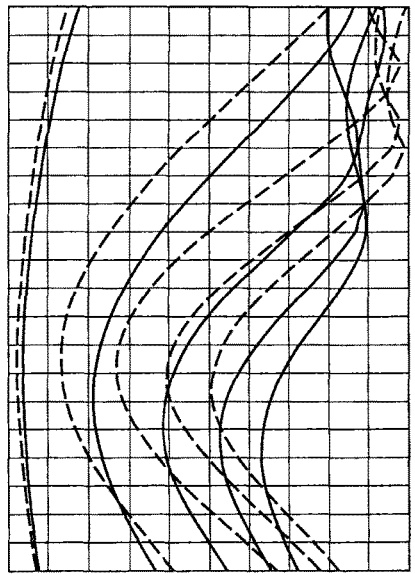
FIG. 8B Defocused MTF characteristic diagrams of the optical system of the rear conversion lens of the present technology.
Figure 8A:
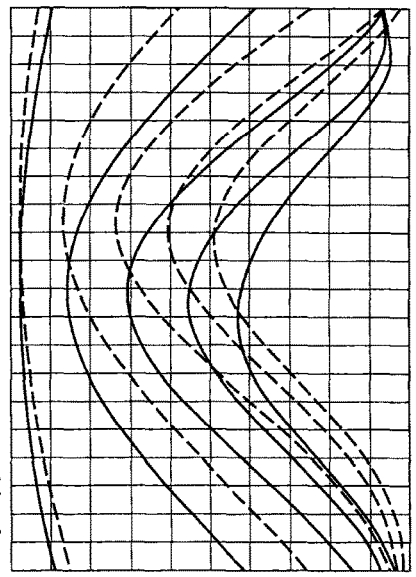
FIG. 8A Defocused MTF characteristic diagrams of the optical system of the rear conversion lens of the present technology.
Figure 8D:
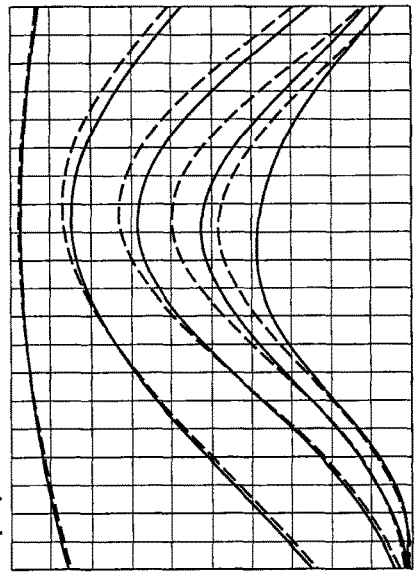
FIG. 8D Defocused MTF characteristic diagrams of the optical system of the rear conversion lens of the present technology.
Figure 8C:
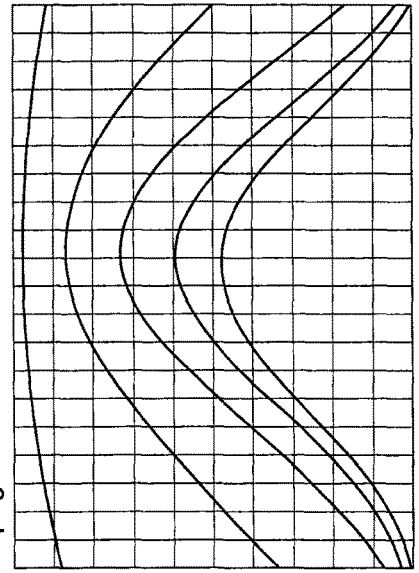
FIG. 8C Defocused MTF characteristic diagrams of the optical system of the rear conversion lens of the present technology.

FIGS. 8A, 8B, 8C, and 8D show defocused MTF characteristic diagrams of the optical system, in which the perpendicular axis represents a contrast (modulation), and the horizontal axis represents a focus shift position. A defocused range is ±0.1 mm. FIG. 8A represents the image height of 0 mm, FIG. 8B represents the image height of 7 mm, FIG. 8C represents the image height of 11 mm, and FIG. 8D represents the image height of 14 mm.

Figure 9:
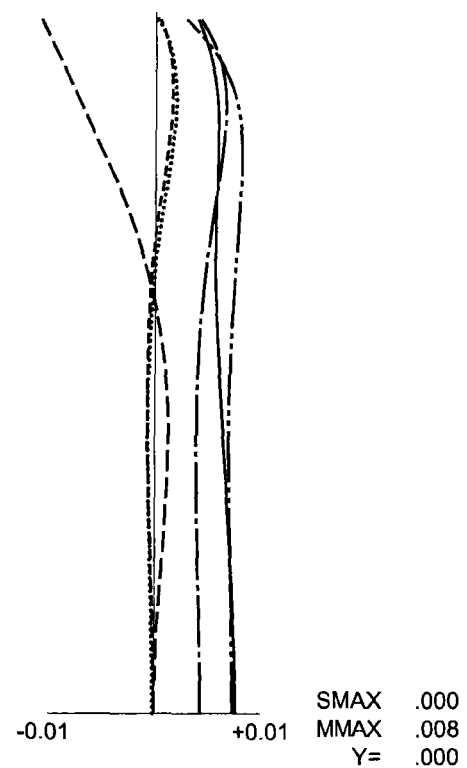
FIG. 9 A spherical aberration diagram of an image-pickup lens for a three-chip camera with a color-separation prism.

FIG. 9 is a spherical aberration diagram of an image-pickup lens for a three-chip camera with a color-separation prism, in which the perpendicular axis represents a light beam height and the horizontal axis represents a distance in the optical axis direction. The drawing scale is ±0.01 mm.

FIG. 10A to FIG. 10H show coma aberration diagrams of the image-pickup lens for a three-chip camera with a color-separation prism, in which the drawing scale is ±0.01 mm. FIGS. 10A, 10C, 10E, and 10G show meridional planes, and FIGS. 10B, 10D, 10F, and 10H show sagittal planes. In order of FIGS. 10A and 10B, 10C and 10D, 10E and 10F, 10G and 10H, aberrations are 5.8 mm, 5 mm, 4 mm, and 0 mm in image height.

FIGS. 11A, 11B, and 11C show, starting from the left, astigmatism, distortion, and chromatic aberration of magnification of the image-pickup lens for a three-chip camera with a color-separation prism. In the astigmatism diagram, the perpendicular axis represents an image height, and the horizontal axis represents a defocusing amount. In the distortion diagram, the perpendicular axis represents an image height, and the horizontal axis represents an amount of a distortion of an image. The drawing scales are ±0.01 mm, +0.30, and ±0.002 mm, respectively. In the astigmatism diagram, the solid line represents the meridional direction, and the dashed line represents the sagittal direction.

FIGS. 12A, 12B, 12C, and 12D show white MTF characteristic diagrams of the image-pickup lens for a three-chip camera with a color-separation prism, in which the perpendicular axis represents a contrast (modulation), and the horizontal axis represents a spatial frequency. FIG. 12A represents the image height of 0 mm, FIG. 12B represents the image height of 4 mm, FIG. 12C represents the image height of 5 mm, and FIG. 12D represents the image height of 5.8 mm.

Figure 13:
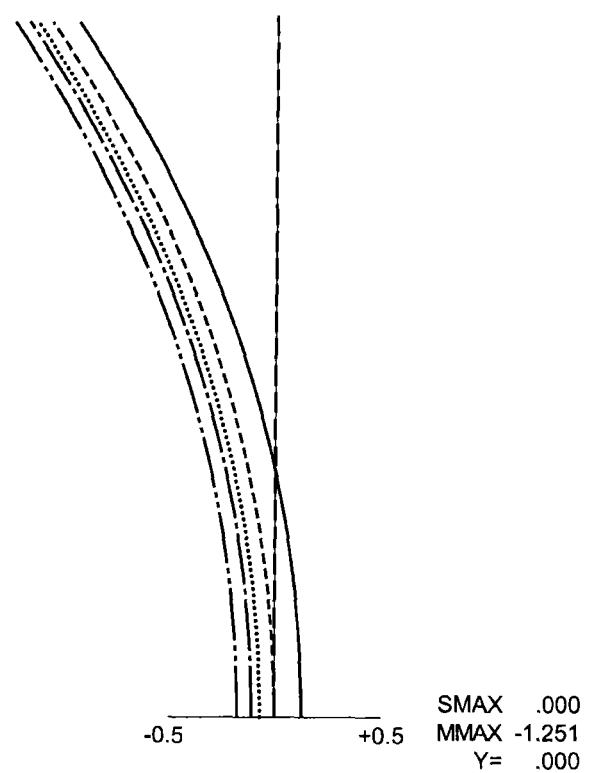
FIG. 13 A spherical aberration diagram of an image-pickup lens for a three-chip camera without a color-separation prism.

FIG. 13 is a spherical aberration diagram of an image-pickup lens for a three-chip camera without a color-separation prism, in which the perpendicular axis represents a light beam height and the horizontal axis represents a distance in the optical axis direction. The drawing scale is ±0.5 mm.

FIGS. 14A, 14B, and 14C show, starting from the left, astigmatism, distortion, and chromatic aberration of magnification of the image-pickup lens for a three-chip camera without a color-separation prism. In the astigmatism diagram, the perpendicular axis represents an image height, and the horizontal axis represents a defocusing amount. In the distortion diagram, the perpendicular axis represents an image height, and the horizontal axis represents an amount of a distortion of an image. The drawing scales are ±0.01 mm, +0.3%, and ±0.002 mm, respectively. In the astigmatism diagram, the solid line represents the meridional direction, and the dashed line represents the sagittal direction.

FIG. 15A to FIG. 15H show coma aberration diagrams of the image-pickup lens for a three-chip camera without a color-separation prism, in which the drawing scale is ±0.5 mm. FIGS. 15A, 15C, 15E, and 15G show meridional planes, and FIGS. 15B, 15D, 15F, and 15H show sagittal planes. In order of FIGS. 15A and 15B, 15C and 15D, 15E and 15F, 15G and 15H, aberrations are 5.8 mm, 5 mm, 4 mm, and 0 mm in image height.

FIGS. 16A, 16B, 16C, and 16D show white MTF characteristic diagrams of the image-pickup lens for a three-chip camera without a color-separation prism, in which the perpendicular axis represents a contrast (modulation), and the horizontal axis represents a spatial frequency. FIG. 16A represents the image height of 0 mm, FIG. 16B represents the image height of 4 mm, FIG. 16C represents the image height of 5 mm, and FIG. 16D represents the image height of 5.8 mm.

[Supplementary Note]

The present technology is not limited to the above-mentioned embodiment, but may be variously modified within the gist of the present technology, as a matter of course.

[Other Structures of the Present Technology]

It should be noted that the present technology may employ the following structures.

(1) A rear conversion lens, including:
a chassis including two opposite ends, the chassis including light-transmitting holes on the ends, respectively;
a first coupler configured to detachably couple one of the ends of the chassis with an image field side of an image-pickup lens of a three-chip camera including three first image sensors, the image-pickup lens being designed based on an assumption that the image-pickup lens is to be used with a color-separation prism in combination;
a second coupler configured to detachably couple the other end of the chassis with a single-chip color camera including a second image sensor, the second image sensor including an image field larger than an image field of the first image sensors of the three-chip camera; and
an optical system including a first lens group, a second lens group, and a third lens group arranged in the chassis in this order from an object side, the first lens group having a negative compound focal length, the second lens group being configured to correct a spherical aberration, the third lens group being configured to form an image.

(2) The rear conversion lens according to (1), in which
the first lens group includes first three-bonded lenses,
the second lens group includes a concave lens, a convex lens, and second three-bonded lenses in this order from the object side, and
the third lens group includes a convex lens.

(3) The rear conversion lens according to (2), in which
a compound focal length of the second three-bonded lenses and the third lens group is positive.

(4) The rear conversion lens according to (2) or (3), in which
the first three-bonded lenses and the second three-bonded lenses satisfy a conditional expression (1), $$-3.0 < (f2G)/(f1G) < -1.2 \tag{1}$$

where
f1G is a compound focal length of the first three-bonded lenses, and
f2G is a compound focal length of the second three-bonded lenses.

(5) The rear conversion lens according to any one of (2) to (4), in which
the first three-bonded lenses satisfy a conditional expression (2), $$n1G1 > n1G3 > n1G2 \tag{2}$$

where
n1G1 is a refractive index of a first lens of the first three-bonded lenses from the object side,
n1G2 is a refractive index of a second lens of the first three-bonded lenses from the object side, and
n1G3 is a refractive index of a third lens of the first three-bonded lenses from the object side.

(6) The rear conversion lens according to any one of (2) to (5), in which
the second three-bonded lenses satisfy conditional expressions (3) and (4), $$n2G2 > n2G1 \tag{3}$$

$$n2G2 > n2G3 \tag{4}$$

where
n2G1 is a refractive index of a first lens of the second three-bonded lenses from the object side,
n2G2 is a refractive index of a second lens of the second three-bonded lenses from the object side, and
n2G3 is a refractive index of a third lens of the second three-bonded lenses from the object side.

DESCRIPTION OF SYMBOLS

Dn . . . n-th distance between surfaces from object side
FLn . . . n-th filter, etc. from object side
FP . . . flange plane on image-pickup lens for three-chip camera
IMG . . . image field of image sensor
Ln . . . n-th lens from object side
SC . . . sensor cover
Sn . . . n-th surface of lens or filter from object side
10 . . . chassis
20 . . . first mount
30 . . . second mount

The invention claimed is:

1. A rear conversion lens, comprising:
a chassis including two opposite ends, the chassis including light-transmitting holes on the ends, respectively;
a first coupler configured to detachably couple one of the ends of the chassis;
a second coupler configured to detachably couple the other end of the chassis; and
an optical system including a first lens group, a second lens group, and a third lens group arranged in the chassis in this order from an object side, the first lens group having a negative compound focal length, the second lens group being configured to correct a spherical aberration, the third lens group being configured to form an image,
wherein
the first lens group includes first three-bonded lenses,
the second lens group includes a concave lens, a convex lens, and second three-bonded lenses in this order from the object side, and
the third lens group includes a convex lens.

2. The rear conversion lens according to claim 1, wherein
a compound focal length of the second three-bonded lenses and the third lens group is positive.

3. The rear conversion lens according to claim 2, wherein
the first three-bonded lenses and the second three-bonded lenses satisfy a conditional expression (1), $$-3.0 < (f2G)/(f1G) < -1.2 \tag{1}$$

where
f1G is a compound focal length of the first three-bonded lenses, and
f2G is a compound focal length of the second three-bonded lenses.

4. The rear conversion lens according to claim 3, wherein the first three-bonded lenses satisfy a conditional expression (2), $$n1G1 > n1G3 > n1G2 \quad (2)$$

where n1G1 is a refractive index of a first lens of the first three-bonded lenses from the object side, n1G2 is a refractive index of a second lens of the first three-bonded lenses from the object side, and n1G3 is a refractive index of a third lens of the first three-bonded lenses from the object side.

5. The rear conversion lens according to claim 4, wherein the second three-bonded lenses satisfy conditional expressions (3) and (4), $$n2G2 > n2G1 \quad (3)$$

$$n2G2 > n2G3 \quad (4)$$

where n2G1 is a refractive index of a first lens of the second three-bonded lenses from the object side, n2G2 is a refractive index of a second lens of the second three-bonded lenses from the object side, and n2G3 is a refractive index of a third lens of the second three-bonded lenses from the object side.

6. A rear conversion lens, comprising:

a chassis including two opposite ends, the chassis including light-transmitting holes on the ends, respectively;

a first coupler configured to detachably couple one of the ends of the chassis;

a second coupler configured to detachably couple the other end of the chassis; and an optical system including a first lens group, a second lens group, and a third lens group arranged in the chassis in this order from an object side, the first lens group having a negative compound focal length, the second lens group being configured to correct a spherical aberration, the third lens group being configured to form an image, wherein the first lens group includes first three-bonded lenses.

7. A rear conversion lens, comprising:

a chassis including two opposite ends, the chassis including light-transmitting holes on the ends, respectively;

a first coupler configured to detachably couple one of the ends of the chassis;

a second coupler configured to detachably couple the other end of the chassis; and an optical system including a first lens group, a second lens group, and a third lens group arranged in the chassis in this order from an object side, the first lens group having a negative compound focal length, the second lens group being configured to correct a spherical aberration, the third lens group being configured to form an image, wherein the second lens group includes a concave lens, a convex lens, and second three-bonded lenses in this order from the object side.

* * * * *